(12) United States Patent
Andersson et al.

(10) Patent No.: US 7,670,088 B2
(45) Date of Patent: Mar. 2, 2010

(54) TOOL FOR CHIP REMOVING MACHINING AND A BASIC BODY THEREFOR

(75) Inventors: Claes Andersson, Valbo (SE); Kjell Englund, Valbo (SE); Görän Pantzar, Sandviken (SE)

(73) Assignee: Sandvik Intellectual Property AB, Sandviken (SE)

(*) Notice: Subject to any disclaimer, the term of this patent is extended or adjusted under 35 U.S.C. 154(b) by 125 days.

(21) Appl. No.: 11/987,858

(22) Filed: Dec. 5, 2007

(65) Prior Publication Data

US 2008/0152439 A1 Jun. 26, 2008

(30) Foreign Application Priority Data

Dec. 12, 2006 (SE) .................... 0602677-7

(51) Int. Cl.
*B23C 5/02* (2006.01)
*B23C 5/22* (2006.01)

(52) U.S. Cl. ......................................... 407/33; 407/66

(58) Field of Classification Search ......... 407/113–116, 407/66, 67, 70, 30, 33
See application file for complete search history.

(56) References Cited

U.S. PATENT DOCUMENTS

| | | | | |
|---|---|---|---|---|
| 2,645,844 A | * | 7/1953 | Longe | 407/94 |
| 3,323,193 A | * | 6/1967 | Greenleaf | 407/86 |
| 3,755,868 A | * | 9/1973 | LaForge et al. | 407/75 |
| 4,420,280 A | * | 12/1983 | Gustafson | 407/109 |
| 5,336,026 A | * | 8/1994 | Noggle | 408/147 |
| 6,146,061 A | | 11/2000 | Larsson | |
| 6,409,435 B1 | * | 6/2002 | Kocherovsky et al. | 407/104 |
| 7,014,393 B2 | * | 3/2006 | Matheis | 407/37 |
| 2006/0140732 A1 | | 6/2006 | Hecht et al. | |

FOREIGN PATENT DOCUMENTS

| | | |
|---|---|---|
| JP | 11-320228 | 11/1999 |
| JP | 2004-291146 | 10/2004 |
| SU | 1252062 A1 | 8/1986 |

\* cited by examiner

*Primary Examiner*—Will Fridie, Jr.
(74) *Attorney, Agent, or Firm*—Drinker Biddle & Reath LLP

(57) ABSTRACT

A tool for chip removing machining, including a basic body, and a cutting insert fixed in an insert seat in the basic body by a tightening element, and which, via at least one shoulder surface, is held pressed against a stop surface in the insert seat. An elastically deformable spring is arranged in the insert seat, which provides, by elastic deformation as a result of tightening of the tightening element, the pressing of the shoulder surface against the stop surface.

12 Claims, 5 Drawing Sheets

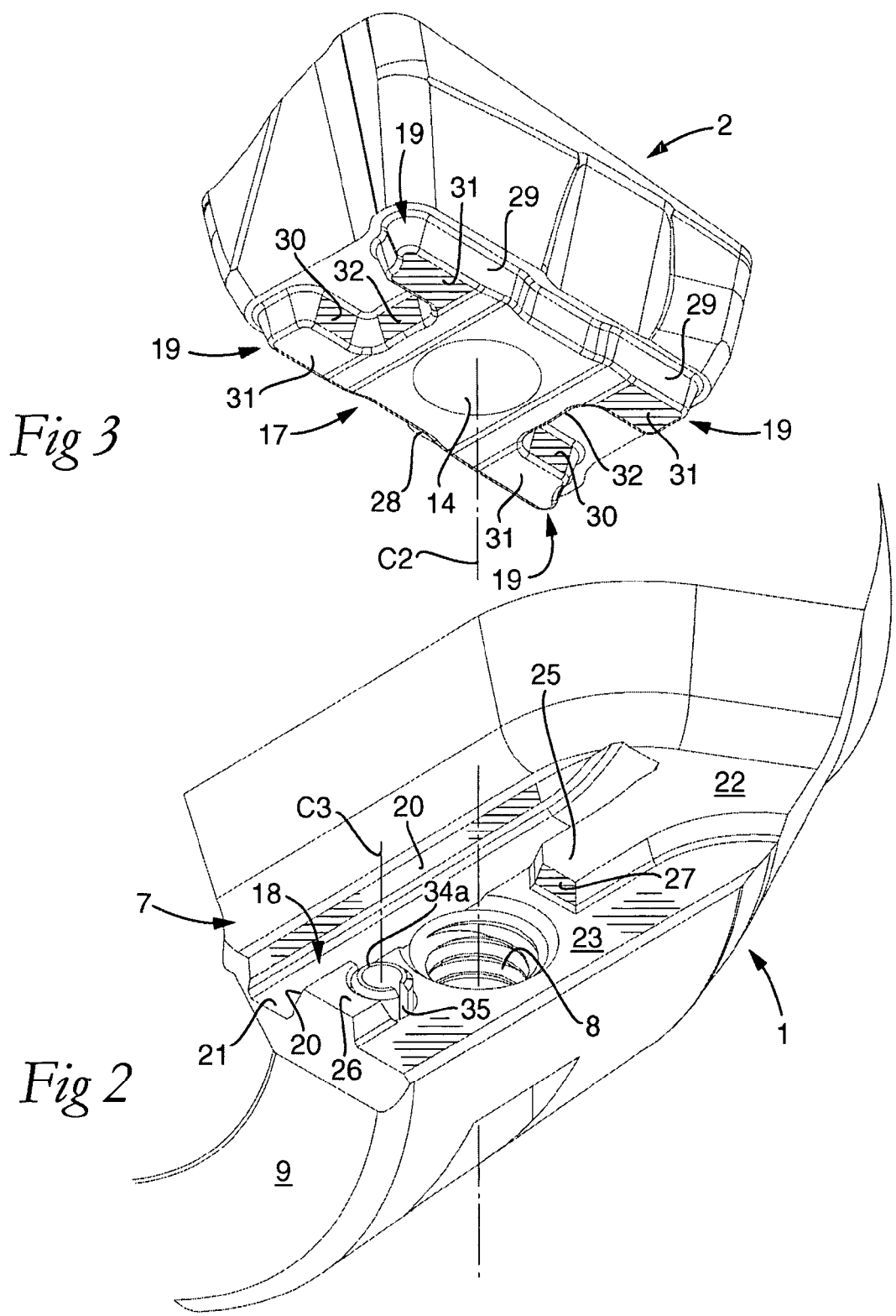

TOOL FOR CHIP REMOVING MACHINING AND A BASIC BODY THEREFOR

This application claims priority under 35 U.S.C. § 119 to Swedish Patent Application No. 0602677-7, filed on Dec. 12, 2006, which is incorporated by reference herein in its entirety.

FIELD OF THE INVENTION

The present invention relates generally to a cutting tool for chip removing machining of the type that includes a basic body and a cutting insert, which is fixed in an insert seat in the basic body by a tightening element, and which, via at least one shoulder surface, is held pressed against a stop surface in the insert seat. The present invention also relates generally to a basic body for such tools. Although the invention is applicable to such cutting tools that are made with simple insert seats in the form of a plane bottom and two plane side-support surfaces against which plane clearance surfaces of the cutting insert are held pressed, the same is suited particularly well for modern tools that make use of more or less sophisticated interfaces of the type that only includes one connecting surface in the basic body and one mating connecting surface in the underside of the cutting insert.

BACKGROUND OF THE INVENTION

U.S. Pat. No. 6,146,061 discloses a cutting tool in the form of a turning tool, the turning or cutting insert of which is detachably connected to a basic body via a partly resilient (deflectable) tightening screw. In connecting surfaces included in an interface between the cutting insert and the basic body, a number of engagement structures are arranged, which in a mounted state engage each other in order to secure the cutting insert in a predetermined position. The engagement structures are arranged in such a way that a certain displacement of the cutting insert is allowed before the tightening screw is finally tightened. The screw hole in the basic body is eccentrically arranged in relation to the hole in the cutting insert in order to apply a certain bias force to the cutting insert in connection with the tightening of the screw. As a consequence of the eccentricity between the holes in combination with a certain thread play and the elasticity of the screw, the screw affects the cutting insert by two tightening forces acting in different directions, viz., on one hand, a bias force, which acts rectilinearly along the connecting surface of the basic body, and on the other hand a tightening force, which acts straight down into the basic body. By the bias force, the cutting insert is displaced in the direction from a front end of the insert seat until the cutting insert abuts by transverse flank or shoulder surfaces against a pair of rear flank surfaces, which function as stop surfaces. When the cutting insert approaches the final position thereof, the holes are still eccentric, which means that the screw shank upon continued tightening will be somewhat deflected. In such a way, it is ensured that the cutting insert maintains contact with the stop surfaces. However, a problem with this tool is that the screw risks becoming worn out because of, among other things, the biasing of the screw, which may result in a deteriorated clamping of the cutting insert. Another disadvantage with the bias is that the tightening force is not brought straight down into the cutting insert, which results in the tightening force being considerably reduced. Furthermore, in practice the screw lacks capacity to secure the cutting insert in a position in which the active cutting edge of the cutting insert can reliably retain an exact space position in relation to the basic body, since the screw, on one hand, via the male thread thereof, has a certain play in relation to the female thread in the basic body, and on the other hand can be deflected away by the cutting forces.

The present invention aims at managing the above-mentioned problems, and at providing an improved cutting tool. Therefore, an object of the invention is to provide a tool having improved clamping, more precisely by eliminating the need to position the cutting insert in the correct end position directly by the proper tightening screw.

Another object of the invention is to provide a tool that not only locates the cutting insert in the desired way initially in connection with mounting, but also can retain the stable fixation of the cutting insert under the severe stresses encountered by the cutting insert during the chip removing machining.

Yet another object of the invention is to provide a tool having a tightening screw that applies a large, unidirected tightening force to the cutting insert, and has a long service life by not needing to be deflected upon the tightening.

SUMMARY OF THE INVENTION

In an embodiment, the invention provides a tool for chip removing machining, including a basic body, and a cutting insert fixed in an insert seat in the basic body by a tightening element, and which, via at least one shoulder surface, is held pressed against a stop surface in the insert seat. An elastically deformable spring is arranged in the insert seat, which provides, by elastic deformation as a result of tightening of the tightening element, the pressing of the shoulder surface against the stop surface.

In another embodiment, the invention provides a basic body for cutting tools, including an insert seat arranged for the receipt of a replaceable cutting insert. The insert seat includes a stop surface against which a shoulder surface included in the cutting insert is pressed. An elastically deformable spring is included in the insert seat, which applies a tightening force to the cutting insert, which provides the pressing of the shoulder surface of the cutting insert against the stop surface.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 2 is an enlarged top-side view showing a first connecting surface included in the basic body;

FIG. 3 is a bottom-side view of the cutting insert, showing a second connecting surface included in the underside of the cutting insert;

DETAILED DESCRIPTION OF THE PREFERRED EMBODIMENTS

Figure 1:
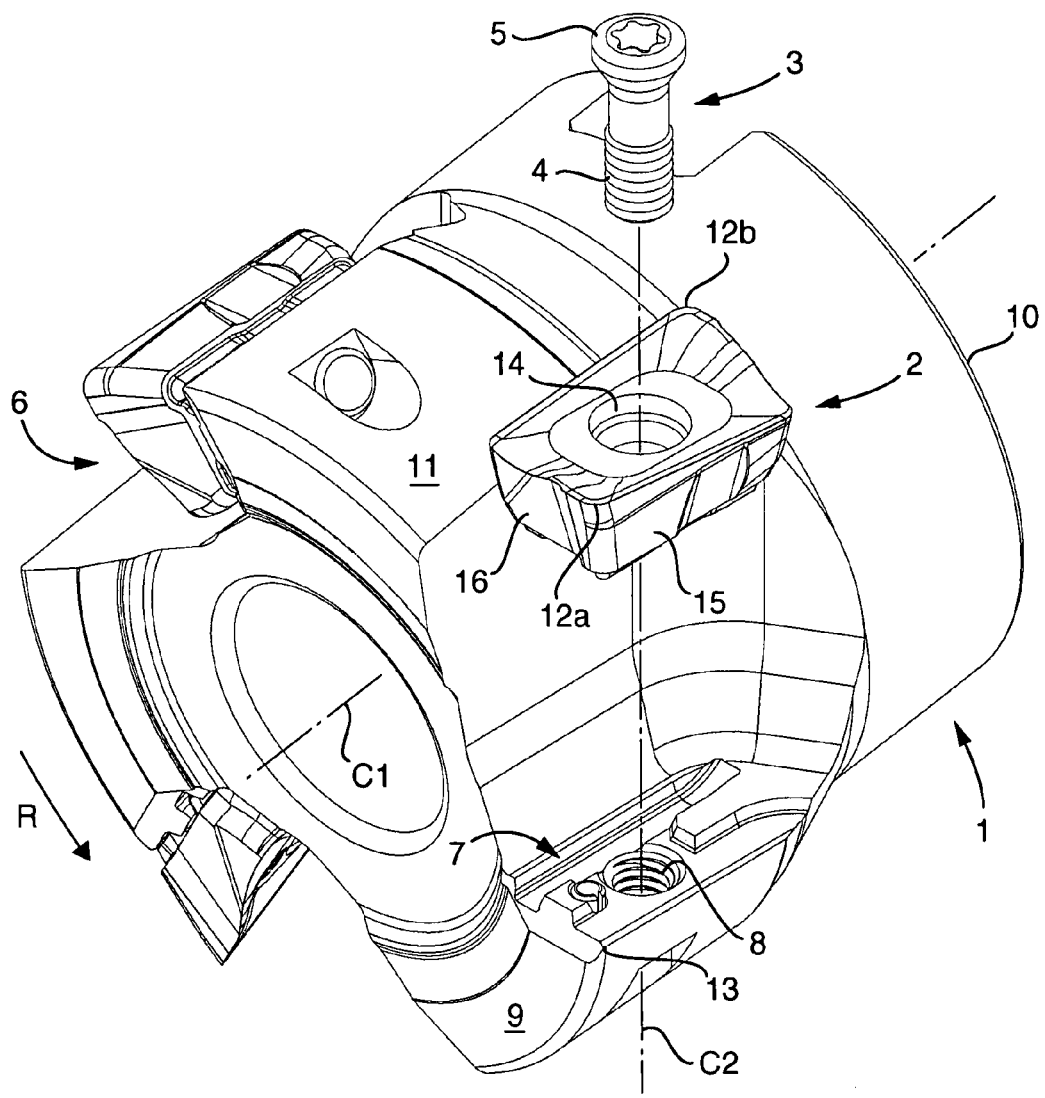
FIG. 1 is a perspective exploded view showing a tool in the form of a milling cutter, a milling or cutting insert, and a tightening screw for the fixation of the same being shown spaced-apart from the basic body of the tool.

In FIG. 1, a tool for chip removing machining (cutting tool) is shown, which includes a basic body 1 and a cutting insert 2, which is fixable in the basic body by a tightening element 3 that defines a geometrically predetermined reference locus C2 in which a tightening force requisite for the retention of the cutting insert 2 is applied to the cutting insert. In the example, the tightening element 3 is in the form of a screw including a male thread 4 and a head 5, which in this case is conical, but which also may have other shapes, for example a flat shape. In the example, the tool is rotatable and includes a milling cutter, more precisely an end or face mill, which includes a plurality of chip pockets 6 in which the same number of cutting inserts 2 may be mounted. In the basic body, adjacent to each chip pocket 6, there is an insert seat in the form of a first connecting surface 7. In the example, a hole 8 having a female thread mouths in the connecting surface 7, the center axis of which thread forms the reference locus C2. The basic body 1 is rotatable around a center axis designated C1. In the figure, 9 designates a front end surface, and 10 a limiting line of a rear end surface of the basic body 1, while 11 designates a rotationally symmetrical envelope surface. In operation, the milling cutter rotates in the direction of the arrow R.

Generally, the cutting insert has a topside and an underside between which clearance surfaces extend. In the transitions between the topside and the clearance surfaces, edge lines are formed. In the example, the cutting insert is elongate and includes two long sides 15 and two short sides 16, which form clearance surfaces adjacent to the edge lines. The cutting insert 2 is indexable by including two cutting edges 12 adjacent to diametrically opposed corners of the cutting insert. Among the cutting edges, the cutting edge 12a identified by index "a" is active by being indexed forward into a position in the vicinity of the free corner 13 of the basic body that is formed where the end surface 9, the envelope surface 11 and the connecting surface 7 meet each other. However, in the shown position, the opposite cutting edge 12b is inactive.

In the cutting insert 2, a central, through hole 14 is formed. The center axis of this hole—as well as of the screw 3—is also designated C2, since the centers of the two holes 8, 14 and of the screw 3 coincide, when the cutting insert is mounted in the basic body. The material of the cutting insert 2 should be hard and wear-resistant. For instance, the cutting insert may be manufactured from conventional cemented carbide, ceramics or the like. However, the basic body 1 may be manufactured from a more elastic or soft material, such as steel or the like.

In order to give a picture of the size of the different components, it may be mentioned that the milling cutter, in the concrete example, has a diameter of 40 mm (i.e., the radius, from the center axis C1 to the main edges of the cutting inserts, is 20 mm).

Now, reference is made to FIGS. 2 and 3, which in more detail illustrate the design of not only the first connecting surface 7 in the basic body 1, but also a co-operating, second connecting surface 17 on the underside of the cutting insert 2. The center axis C2 is common to the connecting surfaces 7, 17 of the cutting insert and of the basic body. In the connecting surfaces 7, 17, engagement structures are formed, more precisely a female-like engagement structures in the form of a chute 18 in the first connecting surface 7, and a plurality of male-like engagement structures 19 formed in the second connecting surface 17, for engagement with the chute 18. The chute 18 is spaced apart from the center axis C2 and includes long narrow flank surfaces 20, which are straight and suitably plane. The flank surfaces 20 run parallel to each other and diverge in the direction from the bottom 21 of the chute 18 toward the upper opening thereof. The connecting surface 7 is in other respects formed with two part surfaces, which are situated on different levels, and one of which is a shoulder surface 22, while the other is a bottom surface designated 23, which is countersunk in relation to the shoulder surface 22 and forms a support surface 23 for the cutting insert. Between the chute 18 and the peripheral borderline of the bottom surface 23, two axially spaced-apart ridges 25, 26 are formed, the first one of which ends in a transverse flank surface 27.

All male-like engagement structures 19 on the underside of the cutting insert are connected with a central base part 28, more precisely with two opposite ends of the same. In the example, the engagement structures 19 are in the form of legs or branches, which together with the base part form a H-like configuration on the underside of the cutting insert. Each leg includes an external flank surface 29 and an internal flank surface 30, which converge in pairs in the direction from the underside of the cutting insert toward a free end surface 31, which forms a bearing surface, and which advantageously may be plane. The base part 28 includes two surfaces 32 that are transverse in relation to the flank surfaces 29, 30 and, via concave transition surfaces, transform into the internal flank surfaces 30 of the legs 19.

In FIGS. 2 and 3, shaded surface fields indicate the surfaces of the leg 19 of the cutting insert that contact co-operating surfaces in the connecting surface of the basic body, when the two connecting surfaces 7, 17 engage each other. Thus, the external and internal flank surfaces 29, 30 of two of the legs contact the flank surfaces 20 of the chute 18. Via the lower bearing surfaces 31 thereof, the other two legs contact the bottom surface 23. A certain rectilinear displacement of the cutting insert is possible in the length extension of the chute. In the mounted state, the flank surface 27 in the connecting surface 7 contacts one of the two flank surfaces 32 in the connecting surface 17 in order to prevent rectilinear displacement of the cutting insert 2. In other words, the flank surface 27 forms a stop surface for the cutting insert.

Figure 4:
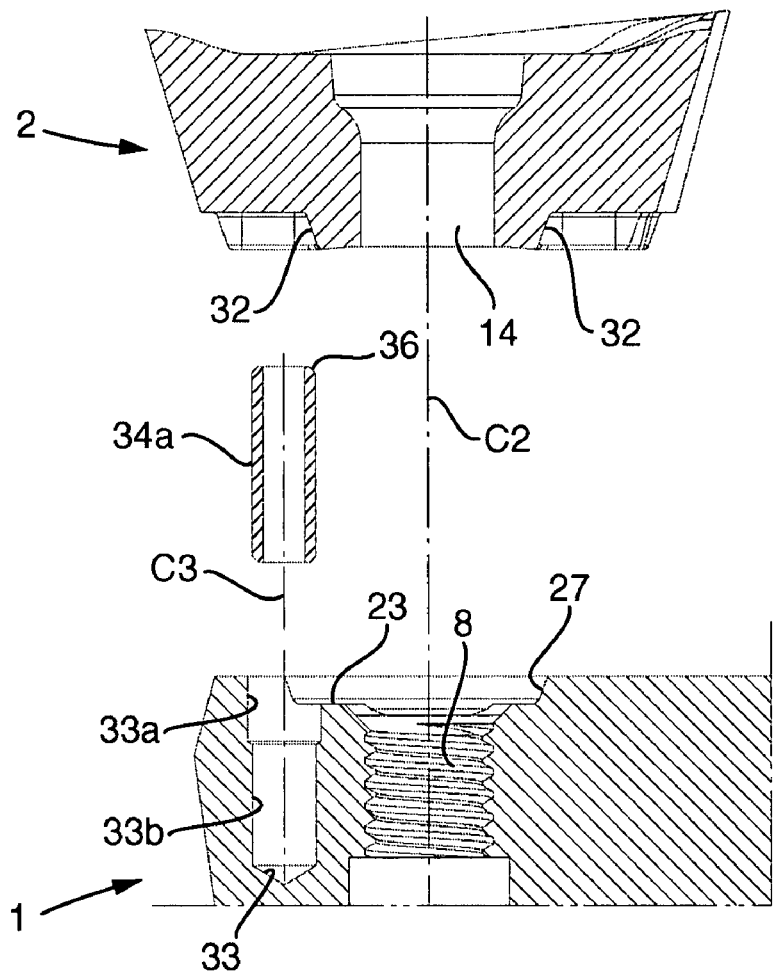
FIG. 4 is an enlarged exploded view showing the cutting insert spaced-apart from the basic body, the figure illustrating a first embodiment of a spring according to an embodiment of the invention.
Figure 5:
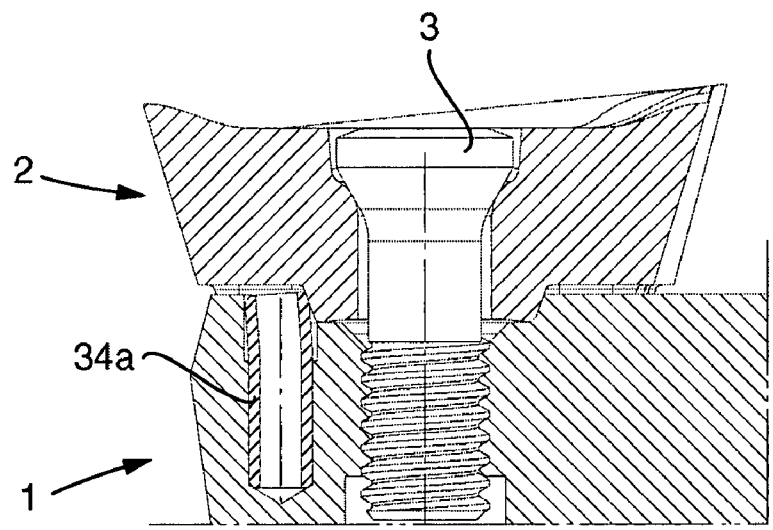
FIG. 5 is a section showing the cutting insert mounted in the basic body.

Reference is now made to FIGS. 4 and 5, which in more detail illustrate a spring that has the purpose of locating the cutting insert in the desired end position in connection with the screw 3 being tightened. In the support surface 23, a hole 33 mouths that is separated from the hole 8 intended for the screw 3. The hole 33 includes an upper part 33a, and a lower part 33b, the diameter of which is smaller than the diameter of the upper part 33a. A center axis C3 of the hole 33 is parallel to the center axis C2 of the screw hole 8. In the hole 33, an upright 34a is mounted, which forms an elastically resilient spring, and which sticks up a distance from the bottom surface 23 in the mounted state thereof according to FIGS. 1, 2 and 5. In the example shown, the upright 34a serving as a spring is in the form of a cylindrical slit-spring pin, which is attached by a press fit in the lower part 33b of the hole 33. By slit-spring pin, in this connection, is meant a cylindrical tubular element of an elastically resilient material, e.g., steel or another metal. Advantageously, the slit-spring pin 34a has a longitudinal slot 35 (see FIG. 2) extending along the entire length of the slit-spring pin. The slit-spring pin, the diameter of which suitably is 1.5-5 mm, includes in a free end a chamfered guide surface 36, which in this case is conical.

The two transverse flank surfaces 27, 32, in this case, lean at approximately the same angles in relation to adjacent plane surfaces in the basic body and on the cutting insert, respectively. In the example, the flank surface 27 accordingly leans obliquely upward and rearward at an angle of 110° to the support surface 23 (and the flank surface 32 at approximately the same angle to the underside of the cutting insert). In such a way, a wedge action is achieved when the base part 28 is pressed down into the space between the flank surface 27 and the slit-spring pin 34a. The angle may of course deviate from 110°, but should be at least 90° and at most 135°.

When mounting the cutting insert 2 in the basic body 1, the following takes place: In connection with a slight, initial tightening of the screw 3, the tapering guide surface 36 of the slit-spring pin 34a abuts against one of the two transverse flank surfaces 32 of the cutting insert. Simultaneously, the other transverse flank surface 32 abuts loosely against the corresponding flank surface 27 in the connecting surface 7. Upon continued tightening, the flank surface 32 is, as a consequence of the above-mentioned wedge action, pressed against the guide surface 36 of the slit-spring pin, which causes an elastic deformation of the slit-spring pin. In doing so, a tightening force is applied to the cutting insert 2, which displaces the same rectilinearly along the connecting surface 7 of the basic body until the opposite flank surface 32 on the cutting insert is in close contact with the flank surface 27 in the basic body. In other words, a displacement of the cutting insert takes place towards the right in FIG. 5, i.e., in the direction from the front end of the basic body. In this position, a tightening force is exerted on the cutting insert to hold together the flank surfaces 27 and 32. In such a way, the proper screw does not have to exert a bias force on the cutting insert. When the cutting insert has reached the final and space-geometrically predetermined position thereof, a last tightening of the screw is effected in order to fix the same. As is seen in FIG. 5, the part of the slit-spring pin that is in the upper area 33a is deflected by the hole sideways, when the cutting insert is mounted in the basic body. This deflection, which is shown in an exaggerated way in FIG. 5, is elastic so far that the slit-spring pin resumes the original shape thereof when the cutting insert is removed.

The slit-spring pin is placed in the immediate vicinity of the ridge 26, i.e., between the screw hole 8 and the front end surface 9 of the basic body. In other words, the tightening element 3 is located between the spring 34 and the flank surface 27.

It should be pointed out that the co-operating flank surfaces 32, 37 may be formed in other ways than the one shown. Thus, at least one of the surfaces could be formed with, on one hand, a thin chamfer, which is inclined at a certain, first angle, e.g., 110°, to the underside of the cutting insert and the connecting surface support surface 23, respectively, and on the other hand a proper wider flank surface, which forms a smaller angle, e.g., all the way down to 90°, with the underside and the support surface, respectively.

In FIGS. 6-9, an alternative embodiment of a spring 34b according to the invention is schematically shown. In this case also, the basic body 1 includes a connecting surface, which co-operates with a connecting surface on an underside of a cutting insert (not shown), the two connecting surfaces including flank surfaces, which determine the end position of the cutting insert when they are pressed against each other. In this case, the spring 34b in question is not mounted in a hole in the connecting surface of the basic body, but between a number of abutment surfaces formed in the basic body which are described in more detail below. Another difference in relation to the preceding embodiment is that the spring directly contacts the screw. In this case, the spring is a C-shaped clip including an outer, arched part 37, as well as two inner arched parts 38, which are each connected to an end of the outer arch part 37 via U-shaped connection portions 39. The clip 34b is anchored in the basic body by being clamped in a space, which is delimited by two abutment surfaces 40, 41, the first one of which is intersected by the screw hole 8, and both of which stick up from the proper bottom 23 of the connecting surface positioned in the basic body, i.e., from the surface on which at least parts of a cutting insert (not shown) rest.

Figure 6:
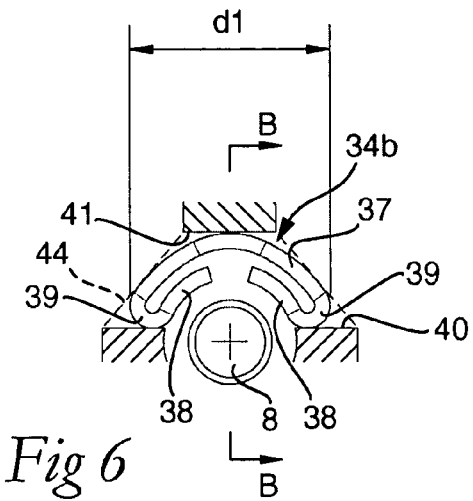
FIG. 6 is a schematic planar section showing an alternative embodiment of the spring.
Figure 7:
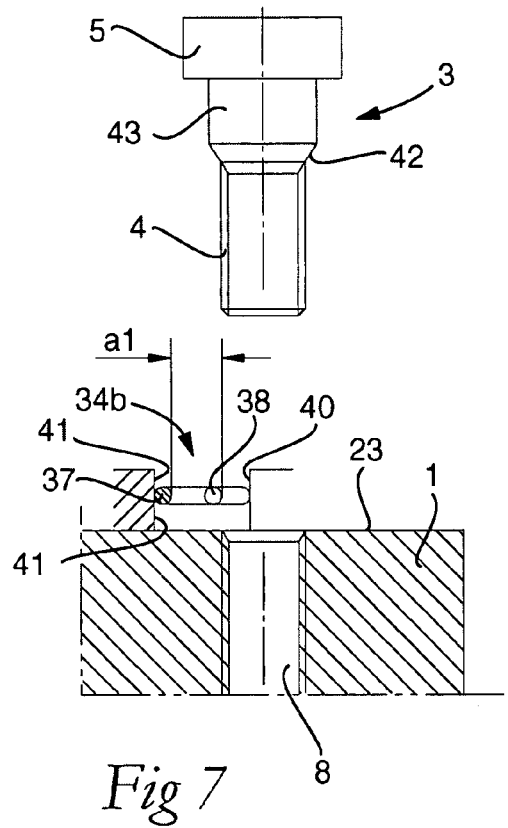
FIG. 7 is a vertical section (B-B in FIG. 6) showing the spring according to FIG. 6 in co-operation with a tightening screw, which is shown spaced-apart from a basic body.
Figure 8:
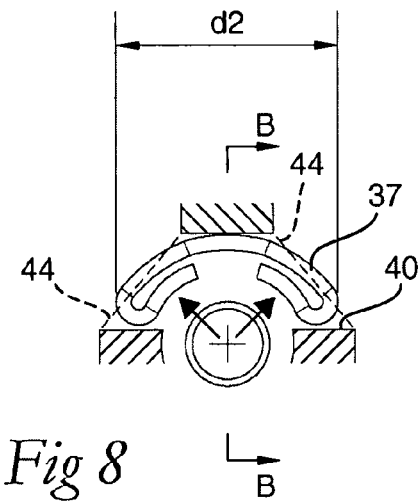
FIG. 8 is a planar section corresponding to FIG. 6 and showing the spring under the influence of the tightening screw in a tightened state.
Figure 9:
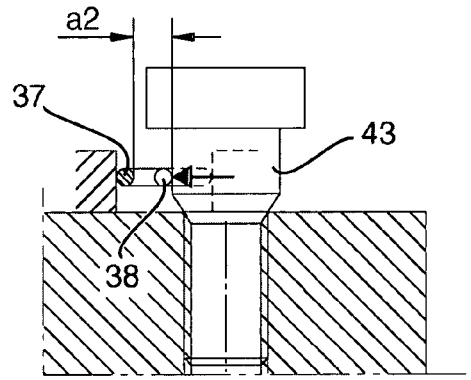
FIG. 9 is a section corresponding to FIG. 7 and showing the tightening screw upon tightening.

The screw 3 is in this case formed with not only a shank 4 having a male thread, but also a conical transition 42 and a cylindrical shank part 43, the diameter of which is greater than the diameter of the threaded shank 4. When the screw 3 either not at all or only partly has been screwed into the hole, the clip 34b is unaffected by the screw and has a first extension d1 according to FIG. 6. The threaded shank 4 then goes free from the clip. When the screw is screwed into the hole further, the conical transition 42 of the screw is brought into contact with the inner arch parts of the clip and urges the parts of the clip in the direction radially outward from the hole (see the arrows in FIG. 8). Upon continued tightening of the screw, the arch parts slide in the pressed-out state onto the thick shank part 43, the clip becoming straight and obtaining an extension d2 that is greater than d1 (the distance between the outer arch part 37 and an inner arch part 38 is designated a1 in FIG. 7 and a2 in FIG. 9). The changed extension of the clip can also be realized by studying the extension of the clip in relation to the dashed lines 44 that extend between the abutment surfaces 40, 41 directed toward each other. When the clip is not pressed outward by the screw 3, such as shown in FIG. 6, the whole clip is entirely inside the dashed lines 44, contrary to what is shown in FIG. 8, where the clip 34 under the influence of the shank part 43 of the screw intercepts the lines 44.

When mounting the cutting insert in the basic body, the following takes place: When the clip is unaffected by the screw, such as shown in FIG. 6, neither is a cutting insert (not shown) affected, a flank surface of which is in the vicinity of some one of the lines 44. In connection with the spring clip 34b being brought to become straighter by being affected by the thick shank part 43 of the screw (the extension of the clip increasing to d2 and the distance between the arch parts 37, 38 decreasing to a2), the cutting insert, not shown, is displaced along the bottom surface 23 in the basic body in order to press a pair of co-operating flank surfaces (not shown) on the cutting insert and in the insert seat, respectively, in close contact against each other. When the cutting insert, by the action of the spring clip 34b, has reached the final and space-geometrically predetermined position thereof, a last tightening of the screw is effected in order to fix the cutting insert.

By arranging, according to the invention, a spring in the connecting surface of the basic body, which has the purpose of pressing co-operating flank surfaces in close contact against each other, when the connecting surface of the cutting insert is pressed into the connecting surface of the basic body, the problems of prior art are solved. Thus, by use of the special spring, the requisite tightening force from a tightening element can be applied vertically down through the cutting insert, i.e., along the center axis C2. This vouches for the tightening force becoming considerable, in particular if the screw has a flat head 5, such as shown in FIG. 7. Simultaneously, the screw gets a long service life.

The preferred embodiments of springs or spring elements, which have been shown in the drawings, are not limiting to the invention as such. Thus, also other types of spring elements, such as, for instance, rubber lugs or the like, are possible to use. It is also possible to manufacture the spring from a number of co-operating, separate parts. In the embodiment shown in FIGS. 4 and 5, the spring is a protruding, elastically resilient upright in the form of a slit-spring pin. An analogous upright could also be made as an integrated part of the basic body, which normally is manufactured from steel that has a certain inherent elasticity. For instance, in some one of the two ridges adjacent to the screw hole, it is possible to mill cut or in another way form a transverse groove that delimits a flat, fairly thin tongue, which can be deflected away elastically when the connecting surfaces of the cutting insert and of the basic body are pressed into each other in the way described above. Neither is the size of the spring limited. Thus, the spring could be a resilient ridge or flange, the length of which does not need to be less than the width or length of the cutting insert.

In the embodiments of the invention that have been shown in the drawings, only one spring element is arranged in the connecting surface of the basic body. It is of course also possible to arrange or form a plurality of spring elements in the basic body, which individually apply an initial tightening force to the cutting insert, which urges the cutting insert to initially assume the correct end position before the same is finally fixed. Furthermore, the invention is also applicable to tools having other tightening elements than screws, e.g., clamps, wedges, etc. Moreover, the configuration of the flank surfaces in the connecting surfaces may be different than what has been shown in the drawings.

The concept "basic body," as used herein, should be interpreted in a wide sense. In the examples, the basic body, in which the first connecting surface of the interface is formed, is a body received in a tool holder. Within the scope of the invention, the connecting surface may also be formed in an attachment, e.g., a shim plate or the like, which in turn, in a suitable way is fixed in the proper basic body. The concept "cutting insert" should also be interpreted in a wide sense and generally be regarded to include all types of replaceable wear parts that have the capability of executing chip removing machining of, particularly, metallic work pieces.

Figure 10:
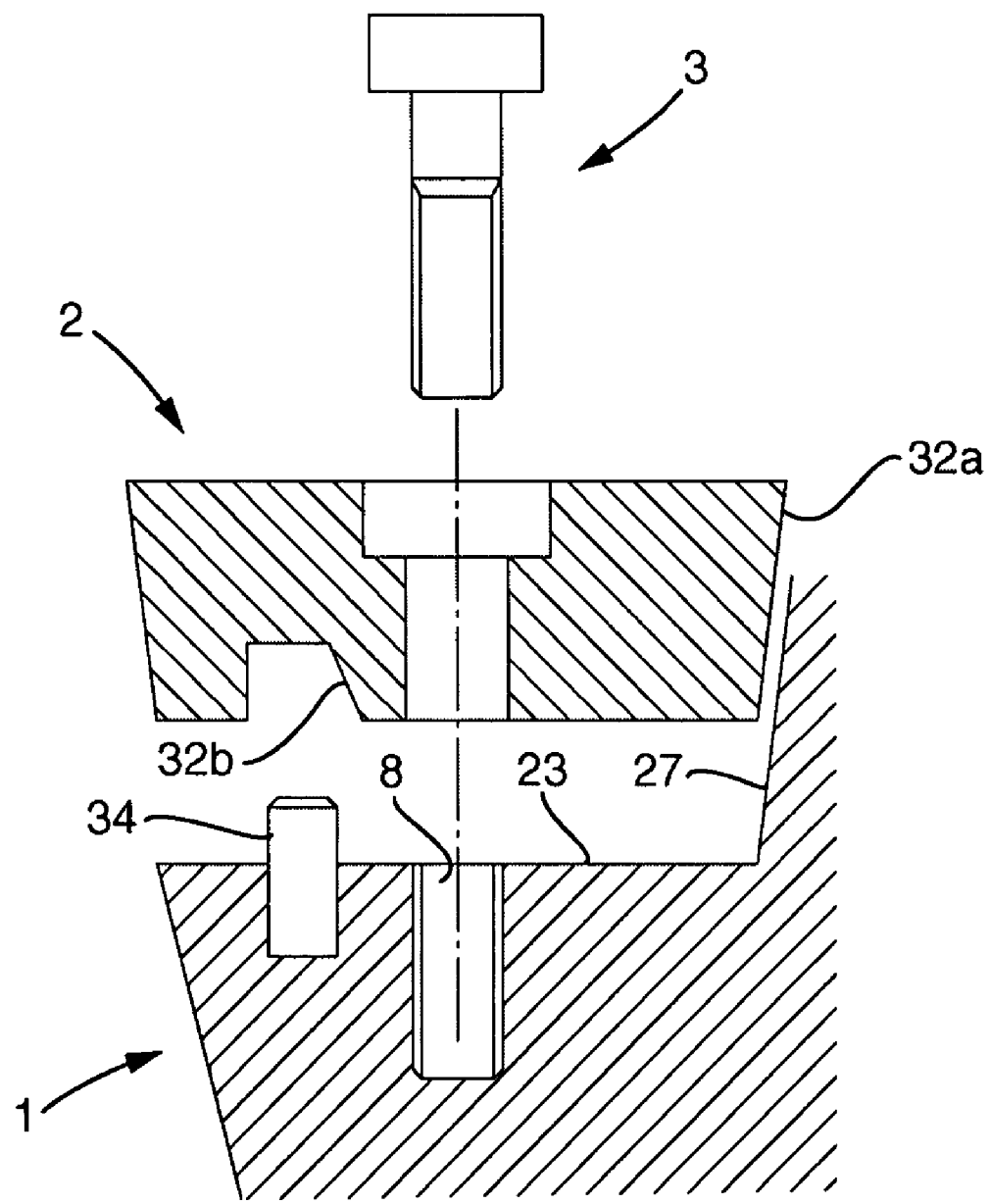
FIG. 10 is a schematic section showing an additional alternative embodiment of the invention.

The invention is not limited to the type of interface exemplified in FIGS. 1-3. Thus, it is even possible to apply the same to such tools that make use of simple insert seats of an older type. Thus, in FIG. 10 an insert seat formed in a basic body 1 is schematically shown, which is delimited by a plane bottom surface 23 and two side-support surfaces 27 directed at an angle to each other (only one of which is visible in FIG. 10), which form stop surfaces against which shoulder surfaces in the form of clearance surfaces 32a of the cutting insert are pressable. In the underside of the cutting insert, a hollow space mouths having a wedge surface 32b, which is pressable against a spring 34, e.g., in the form of a slit-spring pin protruding from the bottom surface. When the screw is tightened by being screwed vertically down into the screw hole 8, the spring 34 applies a lateral tightening force to the cutting insert 2, which presses the clearance surfaces 32a of the cutting insert against the support surfaces 27.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising:
  a basic body;
  a cutting insert fixed in an insert seat in the basic body by a tightening element, and which, via at least one shoulder surface, is held pressed against a stop surface in the insert seat; and
  an elastically deformable spring arranged in the insert seat, which provides, by elastic deformation as a result of tightening of the tightening element, the pressing of the shoulder surface against the stop surface,
  wherein the shoulder surface is a flank surface included in a connecting surface of the cutting insert, and the stop surface is a flank surface included in a co-operating, second connecting surface, which forms the insert seat in the basic body, and
  wherein the tightening element is located between the spring and the two co-operating flank surfaces.

2. The tool according to claim 1, wherein the spring is an upright that extends from a bottom surface included in the connecting surface of the basic body.

3. The tool according to claim 2, wherein the upright is mounted in a hole formed in the basic body, which mouths in the bottom surface.

4. The tool according to claim 2, wherein the upright is a slit-spring pin in the form of an elastically resilient cylinder tube having a longitudinal slot.

5. The tool according to claim 2, wherein the upright is formed with a chamfered guide surface arranged to be pressed against the flank surface in the connecting surface of the cutting insert.

6. The tool according to claim 5, wherein the tightening element is a screw that is brought through a through hole in the cutting insert, and tightened in a threaded hole that mouths in the bottom surface in the basic body.

7. The tool according to claim 3, wherein the tightening element is a screw that is brought through a through hole in the cutting insert, and tightened in a threaded hole that mouths in the bottom surface in the basic body; and the threaded hole and the hole in which the upright is mounted are mutually parallel.

8. A tool for chip removing machining, comprising:
  a basic body;
  a cutting insert fixed in an insert seat in the basic body by a tightening element, and which, via at least one shoulder surface, is held pressed against a stop surface in the insert seat; and
  an elastically deformable spring arranged in the insert seat, which provides, by elastic deformation as a result of tightening of the tightening element, the pressing of the shoulder surface against the stop surface,
  wherein the spring is arranged between the cutting insert and the tightening element.

9. The tool according to claim 8, wherein the spring is between a flank surface of the cutting insert and a screw that is formed with three shank sections, a first section having a male thread, a second thicker section adjacent to a head, and an intermediate section that forms a tapering transition between the first and second sections.

10. The tool according to claim 9, wherein the spring is a C-shaped clip, the convex side of which is facing the flank surface of the cutting insert, and the concave side of which is facing the screw.

11. The tool according to claim 10, wherein the clip includes an outer arch part, which is pressed against the flank surface of the cutting insert, and two inner arch parts, which are pressed against the screw in two contact points tangentially spaced-apart along the screw.

12. A basic body for cutting tools, comprising:

an insert seat arranged for the receipt of a replaceable cutting insert, the insert seat including a stop surface against which a shoulder surface included in the cutting insert is pressed; and an elastically deformable spring included in the insert seat, which provides, by elastic deformation as a result of tightening of a tightening element, the pressing of the shoulder surface of the cutting insert against the stop surface, wherein the tightening element is located between the spring and the cooperating shoulder surface and stop surface.

* * * * *